US012374195B2

(12) United States Patent
Mullins et al.

(10) Patent No.: US 12,374,195 B2
(45) Date of Patent: Jul. 29, 2025

(54) RANDOM DRAW GAME SYSTEM AND METHOD

(71) Applicant: Epic Tech, LLC, Suwanee, GA (US)

(72) Inventors: Brendan Mullins, Alpharetta, GA (US); Scott Vollmer, Allen, TX (US)

(73) Assignee: Epic Tech, LLC, Suwanee, GA (US)

( * ) Notice: Subject to any disclaimer, the term of this patent is extended or adjusted under 35 U.S.C. 154(b) by 301 days.

(21) Appl. No.: 18/133,400

(22) Filed: Apr. 11, 2023

(65) Prior Publication Data

US 2024/0346890 A1 Oct. 17, 2024

(51) Int. Cl.
*G07F 17/32* (2006.01)

(52) U.S. Cl.
CPC ...... *G07F 17/3269* (2013.01); *G07F 17/3293* (2013.01)

(58) Field of Classification Search
CPC .......................... G07F 17/3269; G07F 17/3293
USPC ........................................................... 463/25
See application file for complete search history.

(56) References Cited

U.S. PATENT DOCUMENTS 8,758,111 B2 * 6/2014 Lutnick .................. G07F 17/32 463/16
9,679,442 B2 6/2017 Khal
2009/0093300 A1 * 4/2009 Lutnick ............... G07F 17/3293 463/31
2011/0065490 A1 * 3/2011 Lutnick ............... G07F 17/3223 463/16
2012/0040730 A1 * 2/2012 Stern ......................... A63F 1/02 463/43
2014/0370958 A1 * 12/2014 Lutnick ................. G07F 17/322 463/25
2022/0092939 A1 * 3/2022 Lutnick ............... G07F 17/3223

* cited by examiner

*Primary Examiner* — Pierre E Elisca
(74) *Attorney, Agent, or Firm* — Baker Donelson; Carl M. Davis, II

(57) ABSTRACT

A system for consecutive play of a random draw game in which a generated random sequence of game symbols in a pool of game symbols is used for matching one-by-one with a game card having a predetermined number of the game symbols generated randomly from the pool for each consecutive play of the game, with a prize awarded if the game card matches a predetermine set of the game symbols in the sequence. The system includes a game controller that receives and stores a manually generated random sequence of game symbols and communicates the stored random sequence of game symbols to a plurality of game play stations at which a player may initiate play of the random draw game consecutively with a new randomly drawn game card for each consecutive play. A method of operating the game system for consecutive play of the random draw game is disclosed.

27 Claims, 4 Drawing Sheets

RANDOM DRAW GAME SYSTEM AND METHOD

TECHNICAL FIELD

The present invention relates to apparatus and methods for consecutive plays of an electronic random-draw game. More particularly, the present invention relates to a system for sequencing a pool of game symbols for play of a random-draw game consecutively with a new random draw game card for each consecutive play of the game using a manually drawn sequence of game symbols and for play of a random-draw game having a game card of a predetermined number of game symbols randomly drawn for each consecutive play of the game using the manually randomly drawn sequence of the game symbols for each consecutive play during an active period associated with the sequence of game symbols.

BACKGROUND OF THE INVENTION

The play of random draw games, such as bingo games, involves generation of a random sequence of game numbers for play during the random draw game. This is readily done in jurisdictions that permit use of random number generators. Jurisdictions requiring a manually created sequence are problematic. Khal U.S. Pat. No. 9,679,442 describes a manual draw process for selecting one-at-a-time a number from a pool of numbers for generating a sequence of a population of game play numbers and use of an input device (with validation) to enter the manually drawn number into a sequence stored in a central computer. The central computer then plays the random draw game using the numbers in the sequence. The numbers are compared in sequence with a random set of the population of game play numbers associated with a player, such as a game play card, during a play of the game. The game system process then repeats.

The necessity for manual generation of the sequence limits the number of occurrences of game play and has increased game operating costs over game systems that may use electronic sequence generation. Game play occurrences are scheduled and players gather into game play rooms to receive game cards with random distributions of the pool numbers or to selectively populate a game card with numbers believe to be favored. The administration of game cards further limits the game play occurrences. Game systems using distributed electronic game play stations similarly experience game card selection and distribution problems. Game play stations may be unoccupied by a player until closer to game play occurrence. The capital investment thereby is not gainfully used for revenue generation during periods between game play occurrences. Possible revenue opportunities for play of other games at a game casino are affected as players unengaged with other available casino games wait for game play occurrence.

Accordingly, there is a need in the industry for a game system for manually generating a random sequence of game symbols and for play of consecutive random draw games using the generated sequence. It is to such that the present invention is directed.

BRIEF SUMMARY OF THE INVENTION

The present invention meets the need in the industry for a system of generating a random sequence of game symbols for play of a random draw game consecutively. In one aspect, the present invention provides a system for play of games using a sequence of a plurality of random game play symbols. The system comprises a plurality of game play stations, each game play station configured for display of a game card for play of a random draw game upon selective initiation for play by a game player using a pool of a plurality of game symbols for play of the random draw game. A game card generator configured to generate a respective subset of game symbols selected randomly from the pool of the plurality of game symbols for each respective one of the game cards for play of the random draw game, each respective subset having a predetermined number of the game symbols. A hopper for holding a plurality of tokens, each token denominated with a respective one of the game symbols, and operable for manually selecting one-by-one a game play sequence of the plurality of game symbols. A game controller configured to receive and store the game play sequence of the plurality of game symbols selected from the hopper, to communicate the game play sequence of game symbols to the game play station upon initiation of play of the random draw game, and to communicate a respective subset of game symbols to the game play station for display thereof on the game card during play of the game using the game play sequence. Upon initiation of play of the random draw game, receiving and comparing the sequence of game symbols in the drawn order with the game symbols of the game card, awards a prize if the respective subset of game symbols matches a predetermined number of game symbols of the game play sequence during play of the random draw game.

The game system as recited, further comprising the game controller storing a plurality of game play sequences; and wherein the game play sequence is a selected one of the plurality of game play sequences.

The game system as recited, wherein the selected one of the plurality of game play sequences is selected randomly.

The game system as recited, wherein the selected one of the plurality of game play sequences is excluded from a subsequent until each of the plurality of game play sequences has been selected for use in a play of the random draw game.

The game system as recited, wherein the selected one of the plurality of game play sequences is a one of the plurality of the game play sequences selected in round-robin sequential use one-after-another.

In another aspect, the present invention provides a game system for play of a random draw game, comprising a plurality of game play stations, each for consecutive play of a random draw game initiated selectively, said game play station displaying for each initiated random draw game a subset of a plurality of game symbols for play of the random draw game. A game symbol sequencer having a plurality of tokens, each token denominated with a respective one game symbol of the plurality of game symbols, said game symbol sequencer for drawing manually from the plurality of tokens one-by-one the sequence of the plurality of game symbols. A game controller configured to receive and store a plurality of the sequences, a respective one of the plurality of sequences selectively used during play of one of the random draw games on the one or more of the plurality of game play stations for presenting the game symbols in the order drawn from the game symbol sequencer. A game card generator for generating the respective set of game symbols selected randomly from the plurality of game symbols upon initiation of each play of the random draw game on a respective one of the game play stations, each respective set of game symbols having a predetermined number of the plurality of game symbols. The game system upon determining whether a one of the game symbols in the respective set of game play symbols matches a game symbol presented from the respective one of the sequences and awarding a prize upon the game card matching a predetermined number of the game symbols of the respective one of the sequences.

The game system as recited, wherein the respective one of the sequences, being used selectively for play of the random draw game, is not usable again until each of the others of the plurality of sequences is used during a play of a respective one random draw game.

The game system as recited, wherein the respective one of the sequences is selected randomly for use during play of the initiated random draw game.

The game system as recited, wherein the plurality of sequences are used in sequential order before repeating.

In yet another aspect, the present invention provides a method play of a plurality of random draw games, comprising the steps of: (a) generating a plurality of sequences of a plurality of game symbols, each said sequence drawn randomly one-by-one from a hopper holding a pool of a plurality of game tokens, each of the game tokens having a respective unique game symbol, each of the plurality of sequences for use during play of a random draw game; (b) storing each of the plurality of the sequences in a memory device of a game controller configured for operating a plurality of game play stations, each game play station configured for play of a random draw game initiated by a player; (c) in response to initiating the random draw game, providing the respective game play station with a respective game card having a subset of the plurality of the game symbols selected randomly for play of the random draw game; (d) receiving a respective one of the game symbols one-by-one in the drawn order of a respective one of the sequences for determining whether one of the game symbols of the game card matches said respective one of the game symbols of the sequence; and (e) awarding a prize upon the game card matching a predetermined number of the game symbols game symbols of the respective one of the sequences.

The method for play as recited, wherein the respective sequence is selected randomly.

The method for play as recited, wherein the respective sequence is excluded from further selection until after each other of the plurality of sequences is selected for play of a random draw game.

The method for play as recited, wherein the plurality of sequences are used in sequential order before repeating.

The method for play as recited, wherein the game controller associates a respective period of time with each of the sequences for use during a respective period.

In yet another aspect, the present invention provides a game system for play of games using a random sequence of a plurality of game play symbols, comprising a plurality of game play stations, each game play station configured for display of a game card for play of a random draw game upon selective activation for play by a game player and a pool of a plurality of game symbols for play of the random draw game. A game card generator configured to generate a respective set of game symbols selected randomly from the pool of the plurality of game symbols for each of the game cards for play of the random draw game, each respective set having a predetermined number of the game symbols. Also, a hopper holding a plurality of tokens, each token denominated with a respective one of the game symbols, operable for selecting one-by-one a game play sequence of game symbols. A game controller configured to receive and store the game play sequence of game symbols selected from the hopper, to communicate the game play sequence of game symbols to the plurality of game play stations for play of the random draw game, and to communicate the respective set of game symbols to the game play stations for display thereof on the game card during play of a game using the game play sequence. A respective game play station upon activation for play of the random draw game receives a respective set of game symbols for play, determines whether one of the game symbols in the respective set of game symbols matches the sequence one-by-one of the game symbols for play and awards a prize if the respective set of game symbols matches a predetermined number of game symbols during play of the random draw game.

In a further aspect of the foregoing, the game play sequence of game symbols is valid for play of the game occurring within a predetermined period of time.

In a further aspect, the game controller receives a plurality of game play sequences of game symbols, said game controller further configured to associate a respective period of time with each of the plurality of game play sequences, whereby the game controller communicates a respective one of the plurality of game play sequences and the associated predetermined period of time to the game play devices prior to a starting time of the predetermined period of time.

In another aspect, the present invention provides a game system for play of a random draw game, comprising a plurality of game play stations, each for play of a random draw game consecutively initiated selectively for play by actuation of a game play switch, said game play station displaying a respective set of game symbols for play of the random draw game; a game controller configured to receive and store a sequence of game symbols for play of one or more random draw games on one or more of the plurality of game play stations, said sequence of game symbols communicated from the game controller to each of the plurality of game play stations, and each said game play station receiving upon actuation of the game play switch the respective set of game play symbols for play of said random draw game; a game symbol sequencer having a plurality of tokens, each token denominated with a respective one game symbol of a plurality of unique game symbols, said game symbol sequencer for selecting manually from the plurality of tokens one-by-one a sequence of the plurality of game symbols; and a game card generator configured to generate the respective set of game symbols selected randomly from the plurality of game symbols for each play of the random draw game upon actuation of the game play switch of a respective one of the game play stations, each respective set of game symbols having a predetermined number of the plurality of game symbols, whereby the sequence of game symbols is fixed for play of the random draw game actuated for play on a respective game play station using the generated respective random set of game play symbols for play of the random draw game; and the game system configured for determining whether one of the game symbols in the respective set of game play symbols matches a respective one of the game symbols of the sequence one-by-one for awarding a prize upon the game card matching a predetermined number of the game symbols of the sequence of game symbols.

In a further aspect, the game play sequence of game symbols is valid for play of the random draw game actuated within a predetermined period for play.

In a further aspect, the game controller receives a plurality of game play sequences of game symbols, said game controller further configured to associate a respective start time with a respective one of the plurality of game play sequences, whereby the game controller communicates a respective one of the plurality of game play sequences and the associated respective start time to the game play stations.

In yet another aspect, the present invention provides a method for a game system to play a plurality of random draw games using a sequence of a plurality of game symbols for repeated plays of the random draw games, comprising the steps of: (a) generating a sequence of game symbols, said sequence selected randomly from a hopper holding a pool of a plurality of game tokens, each of the game tokens having a respective unique symbol, said sequence for play of a plurality of random draw games; (b) storing the sequence in a memory device of a game controller configured for operating a plurality of game play stations, each game play station configured for play of a random draw game by a player by activating a game play instruction; (c) in response to activating the game play instruction, providing the game play station with a game card for play of the random draw game, said game card having a predetermined number of the game symbols for display during play of the random draw game, the game symbols on said game card selected randomly based on the game symbols of the pool; (d) receiving one-by-one a respective one of the game symbols in the sequence for determining whether one of the game symbols of the game card matches said respective one of the game symbols of the sequence; and (e) awarding the player a prize upon the game card matching a predetermined set of game symbols of the sequence of game symbols.

In a further aspect of the method, wherein the game play sequence of game symbols is valid for play of the game occurring within a predetermined period of time.

In a further aspect of the method, wherein the game controller associates a respective period of time with the game play sequence, whereby the game controller communicates the game play sequence and the associated predetermined period of time to the game play stations prior to a starting time of the predetermined period of time.

Objects, advantages, and features of the present invention will become readily apparent upon a reading of the following detailed description of the invention in conjunction with reference to the drawings illustrating the invention.

DETAILED DESCRIPTION

Figure 1:
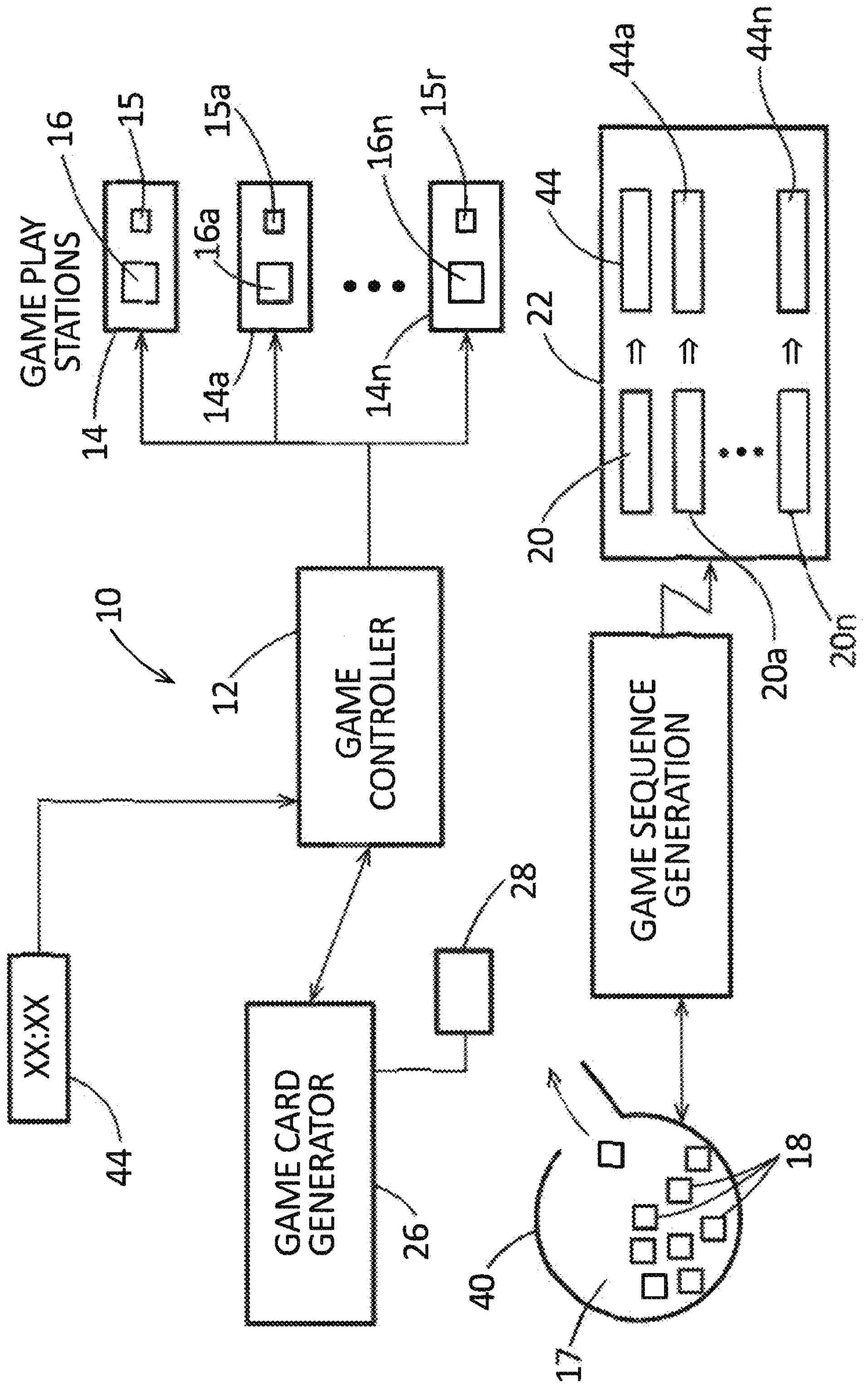
FIG. 1 illustrates a schematic diagram of a game system according to the present invention for generating a random sequence of game symbols for use in consecutive plays of a random draw game using refreshed game cards during a period for which the random sequence is active.

With reference to the drawings, in which like elements have like reference numerals, FIG. 1 illustrates a schematic diagram of a game system 10 according to the present invention for generating manually a random sequence of game symbols for use in consecutive plays of a random draw game using refreshed game cards during a period for which the random sequence is active.

The game system 10 provides a computerized game controller 12 operatively connected to a plurality of game play stations 14. Each game play station 14 provides a microprocessor computer, telecommunications network devices, input devices (such as mouse control device, a touch-sensitive screen, or a switch), and a display 16. In the illustrated embodiment, the game play station 14 is configured for play by a respective game player of a random draw game consecutively upon activation of a game play switch 15. The game play station 14 displays on the display screen 16 the actions of the game during play of a respective random draw game to an end result. If the end result of the play of the respective random draw game is a win, the game play station awards a prize. If the end result of the respective random draw game is not a win, no prize is awarded. Awarded prizes may be displayed such as an accumulator 38 illustrated in FIG. 2. Whether the play of the random draw game results in a win, or not, the player thereafter may select with operation of the game play switch 15 to play a subsequent random draw game consecutively on the game play station 14 to an end result.

The play of the random draw game uses a sequence of a plurality of game play symbols. In the illustrative embodiment, each of the game play symbols is unique. In the illustrative embodiment, the game symbols are whole numbers. The random draw game uses the sequence of the game play symbols generated from a pool 17 of a plurality of game tokens 18. Each token is associated with a respective game play symbol (such as printing, embossing, or other marking mechanism to display the symbol on the token). A sequence 20 of the game symbols is generated manually as discussed below. The sequence 20 is stored in a memory device 22 by the game controller 12. The sequence 20 comprises a random order of the game symbols selected from the pool of game tokens 18 one-by-one. The sequence 20 is used during play of a respective random draw game on the random draw game station 14.

Figure 2:
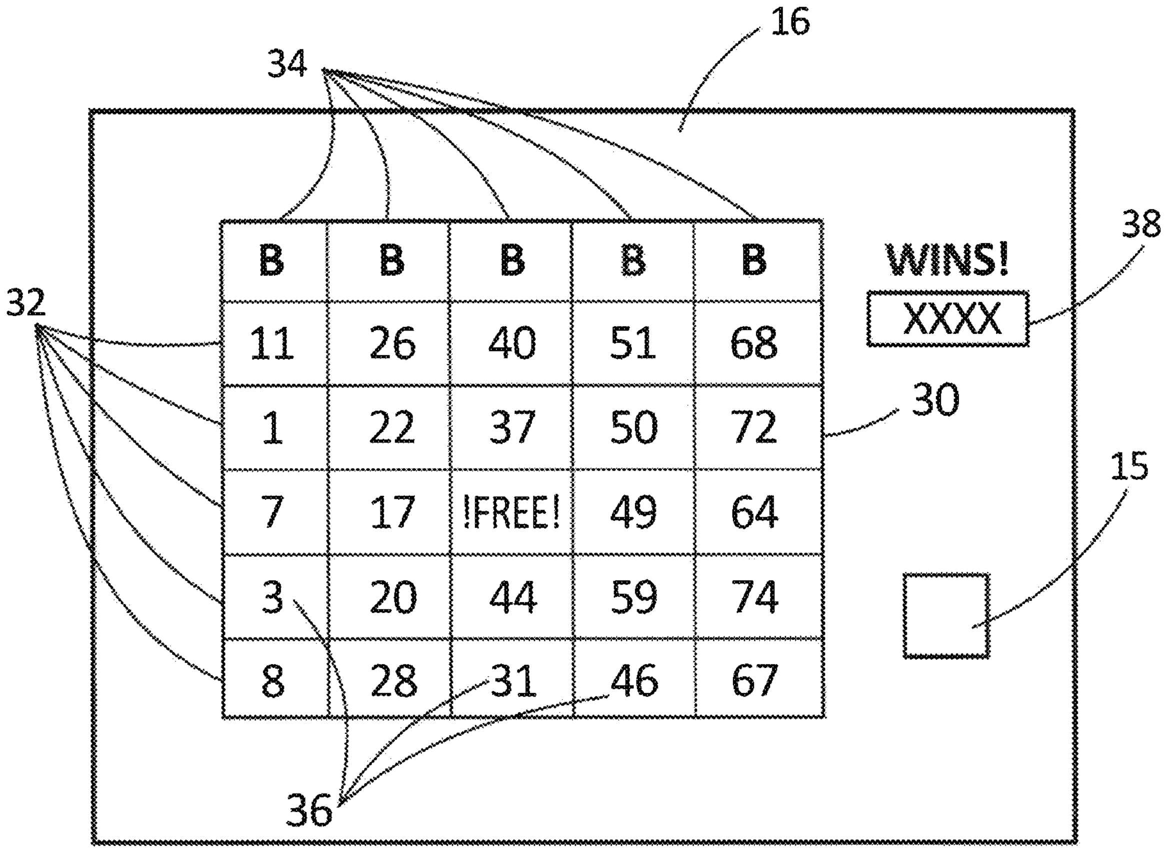
FIG. 2 illustrates a game card of random draw game symbols displayed in a matrix of columns and rows for play with the random sequence of game symbols selected one-by-one in accordance with the present invention for use in consecutive plays of the random draw game with each play with a refreshed game card.

The game system 10 includes a game card generator 26 that operates to generate, or originate, a game play card 28 for each respective random draw game for play on one of the game play stations. Each player using a respective game play station 14 receives a generated game play card 28 for each consecutive occurrence of a play of the random draw game requested by the player by operating the switch 15. The game play card 28 contains a predetermined number of the game play symbols for play of the random draw game. The symbols for each game card are based on the symbols associated with the game tokens 18. The game symbols for the game card 28 are selected 26 randomly from the symbols available in the pool 17 of the plurality of game tokens 18. The game card 28 may be generated manually although in a preferred embodiment the games card 28 is generated electronically using conventional random number generator systems for random selection of the game symbols. The selected game symbols for play are distributed to the respective game play station 14 for display on the screen display 16, for example, as shown in FIG. 2, in a matrix 30 of rows 32 and columns 34 such as used in conventional bingo games, with each symbol in the generated set of game play symbols displayed 36. Typically, the predetermined number of symbols for each game card 28 is less than the number of game tokens available in the pool 17.

During play of the random draw game, the symbols in the sequence 20 of game play symbols are compared one-by-one to the symbols of the game card 28. A win may occur when the game card 28 being played on a one of the game play stations 14 displays game symbols that match a predetermined number of game symbols in the game play sequence or match a predetermined pattern of the game symbols displayed in the matrix 30. A win results in a prize being awarded. An accumulator 38 displays the current value of the accumulated prizes won by a player as the end results of consecutive games played on the respective game play station 14.

The sequence 20 comprises a predetermined number of the game symbols; for example, a sequence having a random order of all of the game tokens in the pool 17, or in some embodiments, a predetermined number of the game symbols available in the pool (which predetermined number is less than the number of game tokens available in the pool). The sequence 20 provides the order in which the game symbols are presented for play of the random draw game on the game play station 14.

The game system 10 generates 39 the sequence 20 by a manual random draw of game tokens 18 one-by-one from the pool of game tokens. The game system 10 includes a hopper 40 that holds the pool 17 of the game tokens 18. Each separate game token 18 is denominated with a respective one of the game symbols. The hopper 40 is operable for random intermixing of the pool 17 of the game tokens 18. The hopper 40 in the illustrated embodiment includes a door 42. Upon opening the door 42, the sequence 20 originates by removing one token 18 at a time from the hopper 40. The selection may continue one-at-a-time until the sequence 20 is generated in random order. Alternatively, the door 42 may be closed and the hopper operated to again intermix the remaining game tokens 18 randomly before stopping the intermixing and opening the door to remove another one of the remaining game tokens for the next symbol in the sequence 20. Other hopper devices are well known for intermixing of the pool and for selective removal of tokens one-by-one for generation of the game play sequence 20.

In the illustrated embodiment, the symbol associated with the randomly selected game token 18 is recorded as selectively drawn from the hopper 40 to originate the random order sequence 20. Upon completion of the sequence by random draw of the game tokens 18 from the hopper 40, the sequence 20 is communicated to the game controller 12. The game controller 12 stores the sequence 20 in the memory device 22. Alternatively, the randomly selected game token 18 is communicated to the game controller 12 for entry into the sequence 20 stored in the database 22. In an embodiment, the game controller 12 validates the communicated game token symbol, for example, as to duplicate entry and being a symbol available within the pool of available symbols.

The game controller 12 receives and stores the game play sequence 20 of game symbols selected manually from the hopper 40, communicates the game play sequence 20 of game symbols to the plurality of game play stations 14 for play of the random draw game as requested by a game player using one of the game stations 14, and communicates a respective set of game symbols for the game card 28 to the game play station 14 for display during play of a game using the game play sequence 20. The game play sequence 20 used during a respective play is one of the plurality of manually drawn game sequences. The particular game play sequence 20 may be available for use during a preselected period of time, may be a round-robin sequence of using each of the plurality of game sequences one after another, or may be a randomly selected one of the plurality of game sequences.

In an alternate embodiment of the game system 10, the game controller 12 associates the sequence 20 with a use period of time generally 44. The time 44 is stored in the memory device 22 in association with the respective sequence 20. The use period 44 for the sequence 20 is defined by a start time, a duration, and an end time. This defines an active period during which the respective sequence 20 is operative for use in play of the random draw game on the game play stations 14. The duration may be minutes, or hours, or other suitable duration. The game sequence 20 in this embodiment is thus used by each random draw game station 14 for play of each respective one of the random draw games activated for play during the use period 44 associated with the sequence 20. The sequence 20 thus remains consistent for each play of the random draw game. However, prior to commencing a respective play of the random draw game, the respective game play station 14 receives from the game controller 12 a new random draw game card 28 for play of the random draw game activated for play on the game station by the switch 15. The player thus plays a one random draw game, or subsequent consecutive games, using the sequence 20 during its respective duration period with the renewed or refreshed game card 28 that randomly changes for each occurrence the player chooses to play the random draw game consecutively to achieve an end result.

The disclosed embodiment provides a game system 10 suitable for play of random draw games such as bingo in jurisdictions requiring a manual draw 39 of the queue sequence 20. The game system 10 may readily operate with player rooms or alternatively within an electronic game system having the controller 12 and the plurality of interconnected game play stations 14. Each of the game play stations 14 may be selectively operated independently by a respective game player for selective play of consecutive random draw games using the game sequence 20, such as the game sequence active during the associated period (or alternatively, available for use based on round-robin sequence of the plurality or selected randomly for use for a respective play of the random draw game).

The sequence 20 of game symbols is used during play of the random draw game, such as bingo, by the plurality of players each at a respective remote spaced-apart game play station 14 that communicate with the central controller 12. The sequence 20 in the illustrative embodiment is valid for game play for a predetermined period of time (for example, for a respective one play of the random draw game or alternatively for a period such as an hour.) Each game play station 14 in use by a player during that period receives the same sequence 20 of game numbers. The sequence 20 is played as to the player's respective game card 28. During play, the central controller 12 in the illustrated embodiment communicates a game card 28 (typically represented as a 5×5 matrix) of randomly drawn game symbols (e.g., game play numbers) for the respective player using one of the game stations 14.

Each activation of the switch 15 by the player for play of the random draw game originates generation 26 of a new game card 28 for play of the random draw game consecutively. As illustrated in FIG. 2, the game card 28 is shown on the display 16 as grid or matrix 30. During play of the game, the symbols in the sequence 20 are applied to the player's game card one-by-one and if the game card matches a predetermined pattern or number of matching symbols, the player receives a prize. The player may then select to play again by operating the switch 15. The central controller 12 generates 26 and communicates a new game card 28 of randomly drawn symbols for play of the requested consecutive game. The player may continue to play (each play occurrence in casino operations incurs a cost) and for each occurrence of play, the player receives a new generated game card 28 to which the then-current active sequence 20 is applied.

The game system 10 of the present invention manually generates the random sequence 20 of game symbols for play of random draw games at the plurality of game stations 14. The game controller 12 stores in memory 22 the generated sequence 20. The game controller 12 associates the sequence 20 with a respective active use period having a start time, a duration, and an end time. The game controller 12 provides a new random draw game card for each play of the random draw game by a player on each of the game stations. The game controller 12 communicates to the game play stations the sequence 20 and its associated valid period for play. After a player at a game play station selects to play a random draw game, the game station 14 obtains from the game controller 12 a new randomly generated game card.

Figure 3:
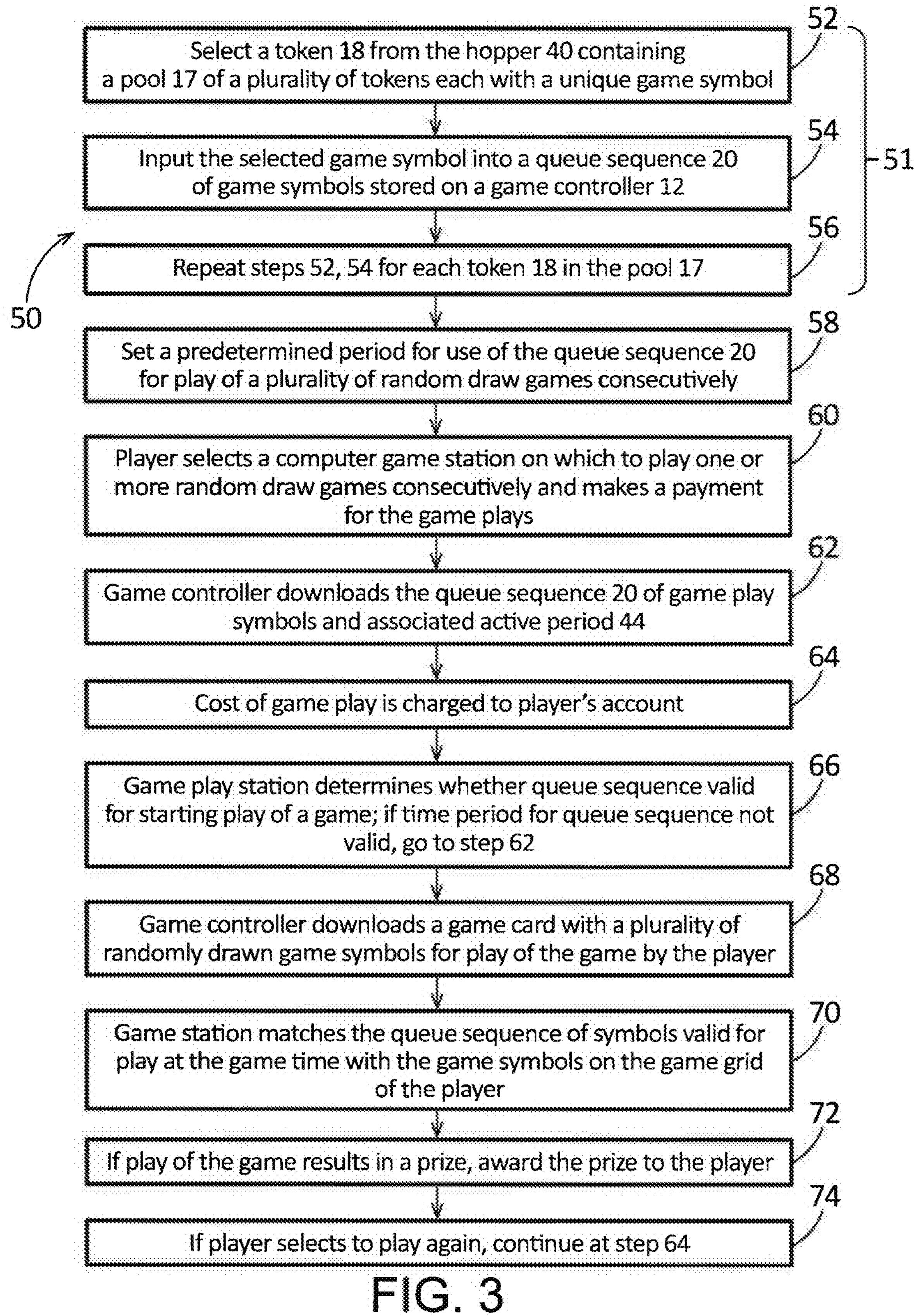
FIG. 3 illustrates a system process for generating a random sequence of game symbols and play a random draw game consecutively using the random draw sequence during a period for which the random sequence is active for play.

An exemplary game play process 50 in accordance with the present invention is illustrated in FIG. 3. The game play process 50 initiates with the game controller 12 receiving and storing the sequence 20 of game play symbols generally 51. The sequence 20 is generated manually, by selecting 52 one game token from the game token hopper 40 that contains the pool of the plurality of game symbol denominated game tokens 18. The game tokens 18 are selected one-by-one and recorded. The recorded sequence is communicated to the game controller 12. The game controller enters 54 each selected symbol into the queue sequence 20 stored in memory 22. The manual selection and recording repeats 56 for each game token in the pool.

The game controller 12 sets 58 a predetermined period for use of the queue sequence 20 for play of the random draw games consecutively at the play game stations 14. The game controller 12 communicates 62 the sequence 20 and the associated valid play period 44 (starting time, duration, and ending time) to the game play stations 14.

A player selects 60 a respective game station 14 on which to play one or more random draw games consecutively. Casio-operation environments involve payments from players for play of the random draw games. There are conventional devices and processes by which a player adds monetary value to an account and which the player may then use for play of the random draw games with deductions from the account to accomplish a payment for the game play.

The game controller 12 communicates 62 the queue sequence 20 of game play symbols to the game play stations 14. In the embodiment having an active period for use of the sequence 20, the game controller 12 further communicates the associate active period 44.

The player instructs the game play station 14 using the switch 15 to operate for play of the random draw game. The game play station 14 charges 64 the player's account for play of the random draw game. The game play station 14 determines 66 whether the queue sequence 20 is valid for play by referring to the active period 44 associated with the queue sequence. If valid for play, the game controller 12 generates 68 a game card of randomly drawn game symbols from the pool. The game controller 12 communicates the generated set of game play symbols for the player's game card for play of the random draw game. If the play period 44 is not valid for the sequence 20, the game play station 14 requests the game controller 12 to communicate a sequence 20 and its associated active period.

The computer game station 13 determines whether the queue sequence 20 is valid for play of the game. That is, the game play must occur in the predetermined period for the queue sequence 20. For example, the game play must initiate within the predetermined period. If the time period for the game sequence 20 has expired, the game play station 14 requests the game controller 12 to provide a game play sequence 20 and associate play period valid for use.

The game play station plays 70 the random draw game. With reference to FIG. 2, the game card 28 displays the game symbols 36. The game play station 14 determines whether the set of game symbols of the game card match respective ones of the sequence. The matching determination is accomplished with the sequence one-by-one. During play, the game play station 14 may illustrate a match such as with audio and/or video indications. These include audio sounds such as triumphant music or sounds and video displays such as changing symbol color, flashes, displays of stars, and the like for altering and encouraging a player.

The game play station keeps track of matching symbols. If the game card 28 contains matching symbols corresponding to a win, a prize is awarded 72. Wins may be based on common bingo or random draw game win criteria, including but not limited to having a predetermined number of matching symbols or having a predetermined pattern of matching symbols.

After the end result of the play of the random draw game, the player may select 74 to play a consecutive random draw game. This is accomplished by activating the switch 15. In some embodiments, the player plays independently and the consecutive game does not wait of play of other random draw game stations 14 to complete play of respective games. In another embodiment, each game play station 14 plays the sequence simultaneously, and the player is playing against other players each at a respective game play station. Such community play is exciting in that a player may have four spaces matching and needing a fifth symbol to match to compete a pattern for a win. The player excitedly awaits the reveal of the next symbol in the sequence 20. The next symbol however may not be a winning symbol for the player, but rather completes a pattern for a player on another of the game play stations.

At game end, the player may select to play a consecutive random draw game by operating the game play switch 15. The game flow process repeats at step 64 for payment for the play of the game. Briefly, the game controller 12 generates and communicates a refreshed game card 28 having random draw symbols of the pool for play of the consecutive game. The game play station determines the queue sequence remains valid and commences one-by-one presentation of the random ordered sequence of game symbols. The game play station determines whether the new game card matches the symbols of the sequence, checked one-by-one, until an end result.

The present invention thus holds constant the randomly generated queue sequence of game symbols for use in multiple plays of the random draw game consecutively with the respective game card randomly generated for each activation of the random draw game. That is, the sequence of game symbols is randomly generated manually for use during play of each of multiple consecutive games but the respective game cared in each respective play of the random draw game is refreshed with a random set of game symbols at selective activation of the random draw game for play.

Figure 4:
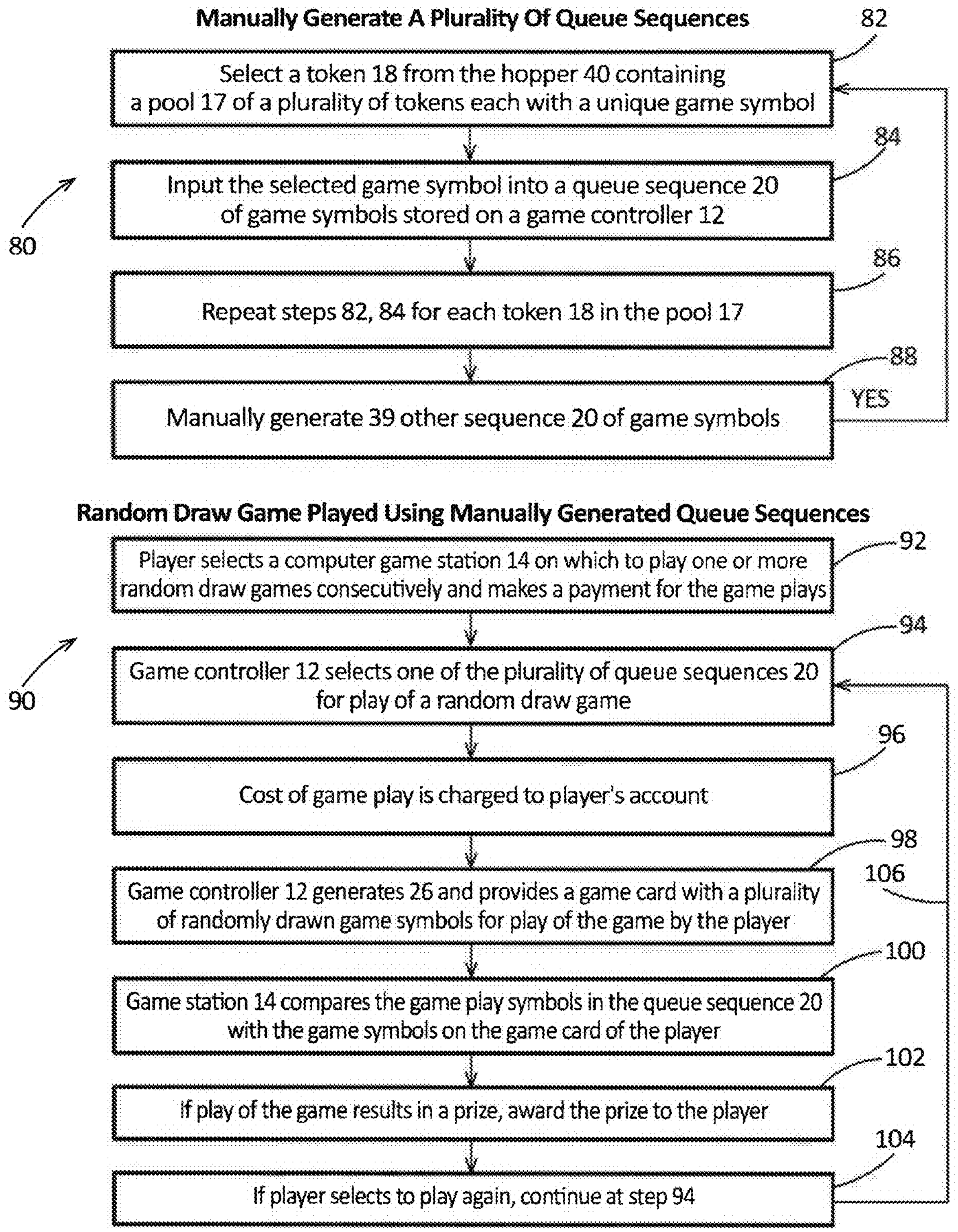
FIG. 4 illustrates a game system for (i) generating a plurality of manual random draw sequences of game symbols and (2) playing consecutive random draw games with each respective play of the random draw game using one of the random draw sequences and a player playing the respective random draw game with a game card of random draw game symbols generated for play of the respective random draw game.

FIG. 4 illustrates a process flow for an alternate embodiment of the game system 10 and method for consecutive plays of the random draw game by the player using the respective game play station 14. In this embodiment, the game controller 12 generates 80 a plurality of manually drawn random draw sequences 20. The plurality of game sequences 20 are available for use 90 during a requested play of the random draw game. In this alternate embodiment, the game sequences 20 are provided by the game controller 12 by a round-robin use process for use each of the plurality of sequences 20 for a respective consecutive play of the random draw game one after the other. Alternatively, the particular sequence 20 is selected from the plurality of queue sequences randomly. Alternatively, no one of the sequences 20, once used for play of a random draw game, may be re-presented for subsequent consecutive play of the random draw game until each of the plurality of sequences has been used for a play of the random draw game.

As depicted in FIG. 4, the game system 10 manually generates 80 a plurality of queue sequences 20. The game system 10 selects 82 a token 18 from the hopper 40 containing the pool 17 of the plurality of tokens 18. Each token 18 has one of the unique game symbols available for play of the random draw game. The associated game symbol of the manually selected token 18 is communicated to the game controller for originating the sequence of game symbols in the queue sequence 20. The selected game symbol is input, or entered, into the sequence of game symbols of the queue sequence 20. The game controller 12 stores the queue sequence 20 in the database 20. The manual selection process continues 86 for each token 18 in the pool 17.

Once each of the tokens 18 in the pool 17 are stored sequentially as selected manually for the queue sequence 20, an additional queue sequence may be generated 88 by replenishing the tokens 18 back into the hopper 40 as the pool 17 and repeating the intermixing and random selection described above as to selection 82 and storing the sequence as selected in another one of the plurality of queue sequences 20*a*. The plurality of queue sequences 20, 20*a*, . . . 20*n* are stored in the database 22 for use by the game controller during consecutive plays 90 of the random draw game.

With continuing reference to FIG. 4 and FIG. 1, the plurality of game sequences 20 are available for use during a respective play of the random draw game. A player selects 92 a respective one of the plurality of game play stations 14 with which to play one or more consecutive random draw games. In particular embodiments, the player conventionally arranges for payment of game plays such as entry of payment to an account associated with the player (accessible by login identification and password), or entry of a monetary transfer (electronic account card or cash receiving device) for game play charges. The player operates the switch 15 to selectively play the random draw game.

The game controller 12 selects 94 one of the plurality of queue sequences 20 for play of the random draw game. The selection may be based on round-robin sequential use one-after-another of the each of the plurality of sequences 20 for a respective one consecutive play of the random draw game. Alternatively, the particular sequence 20 is selected from the plurality of queue sequences randomly. Alternatively, no one of the sequences 20, once used for play of a random draw game, may be re-presented for a subsequent consecutive play of the random draw game until each of the plurality of sequences 20*n* has been used for a play of the random draw game. In this embodiment, a respective sequence is thus excluded from further selection until after each other of the plurality of sequences is selected for play of a random draw game. If applicable, the cost of the play of the random draw game is charged 96 to the player's account and deducted from the balance available for the player.

The sequence of game symbols in the game symbol sequence 20 are presented 100 for comparison to the game symbols of the game card 28. This may be accomplished centrally by the game controller 12 or locally by the game station 14. The sequence of game symbols may be presented one at time for duration play of the random draw game or alternatively compared and the final result displayed as to whether the game card 28 is a winning card, or not. The game system compares the sequence of game symbols and determines whether the game symbols in the respective sequence of game symbols matches the game symbols on the player's game card 28. A win may occur when the game card 28 being played displays game symbols that match a predetermined number of game symbols in the game play sequence or match a predetermined pattern of the game symbols displayed in the matrix 30. A win results in a prize being awarded 102. The accumulator 38 displays the current value of the accumulated prizes won by the player as the end results of consecutive games played on the respective game play station 14.

The player may the select 104 to play another consecutive one of the random draw games. The game system 106 then repeats the game play process described above, returning to the selection step 94.

The foregoing has disclosed a game play system providing a randomly drawn game card refreshed for each consecutive play of the random draw game using a manually drawn sequence of random draw symbols, and more particularly, if a first embodiment using one of a plurality of game sequences selected for use based on round-robin use one after another or randomly, and alternatively use of a one game sequence is not repeated until each of the plurality of game sequences is used in a play of a respective play of a random draw game, or alternatively the game sequence active during a particular period of time associated with the queue sequence for use in play of the random draw game on the plurality of game stations. Variations, changes, and alternative game system may readily be achieved based on the foregoing disclosure within the scope of the claims for such invention appended hereto.

What is claimed is:

1. A system for play of games using a sequence of a plurality of random game play symbols, comprising:

a plurality of game play stations, each game play station configured for display of a game card for play of a random draw game upon selective initiation for play by a game player;

a pool of a plurality of game symbols for play of the random draw game;

a game card generator configured to generate a respective subset of game symbols selected randomly from the pool of the plurality of game symbols for each respective one of the game cards for play of the random draw game, each respective subset having a predetermined number of the game symbols;

a hopper holding a plurality of tokens, each token denominated with a respective one of the game symbols, operable for manually selecting one-by-one a game play sequence of the plurality of game symbols;

a game controller configured to receive and store the game play sequence of the plurality of game symbols selected from the hopper, to communicate the game play sequence of game symbols to the game play station upon initiation of play of the random draw game, and to communicate a respective subset of game symbols to the game play station for display thereof on the game card during play of the game using the game play sequence, whereby upon initiation of play of the random draw game, receiving and comparing the sequence of game symbols in the drawn order with the game symbols of the game card, awards a prize if the respective subset of game symbols matches a predetermined number of game symbols of the game play sequence during play of the random draw game.

2. The game system recited in claim 1, wherein each of the game symbols is unique.

3. The game system as recited in claim 1, wherein the game play station displays the subset of game symbols in a matrix of rows and columns.

4. The game system as recited in claim 1, wherein the game play sequence of game symbols is valid for play of the game occurring within a predetermined period of time.

5. The game system as recited in claim 4, wherein the game controller further communicates the predetermined period with the game play sequence of game symbols to the plurality of game play stations for play of the game.

6. The game system as recited in claim 4, wherein the game play sequence is used for play of each random draw game played consecutively on a respective one of the game play devices during the predetermined period of time.

7. The game system as recited in claim 4, wherein the game controller receives a plurality of game play sequences of game symbols, said game controller further configured to associate a respective period of time with each of the plurality of game play sequences, whereby the game controller communicates a respective one of the plurality of game play sequences and the associated predetermined period of time to the game play devices prior to a starting time of the predetermined period of time.

8. The game system as recited in claim 1, further comprising the game controller storing a plurality of game play sequences; and wherein the game play sequence is a selected one of the plurality of game play sequences.

9. The game system as recited in claim 8, wherein the selected one of the plurality of game play sequences is selected randomly.

10. The game system as recited in claim 9, wherein the selected one of the plurality of game play sequences is excluded from a subsequent selection until each of the plurality of game play sequences has been selected for use in a play of the random draw game.

11. The game system as recited in claim 8, wherein the selected one of the plurality of game play sequences is a one of the plurality of the game play sequences selected in round-robin sequential use one-after-another.

12. A game system for play of a random draw game, comprising:

a plurality of game play stations, each for consecutive play of a random draw game initiated selectively, said game play station displaying for each initiated random draw game a subset of a plurality of game symbols for play of the random draw game;

a game symbol sequencer having a plurality of tokens, each token denominated with a respective one game symbol of the plurality of game symbols, said game symbol sequencer for drawing manually from the plurality of tokens one-by-one the sequence of the plurality of game symbols;

a game controller configured to receive and store a plurality of the sequences, a respective one of the plurality of sequences selectively used during play of one of the random draw games on the one or more of the plurality of game play stations for presenting the game symbols in the order drawn from the game symbol sequencer, a game card generator configured for generating the respective set of game symbols selected randomly from the plurality of game symbols upon initiation of each play of the random draw game on a respective one of the game play stations, each respective set of game symbols having a predetermined number of the plurality of game symbols; and the game system configured for determining whether a one of the game symbols in the respective set of game play symbols matches a game symbol presented from the respective one of the sequences for awarding a prize upon the game card matching a predetermined number of the game symbols of the respective one of the sequences.

13. The game system as recited in claim 12, wherein the respective one of the sequences, being used selectively for play of the random draw game, is not usable again until each of the others of the plurality of sequences is used during a play of a respective one random draw game.

14. The game system as recited in claim 12, wherein the respective one of the sequences is selected randomly for use during play of the initiated random draw game.

15. The game system as recited in claim 12, wherein the plurality of sequences are used in sequential order before repeating.

16. The game system as recited in claim 12, wherein the game symbol sequencer comprises a hopper holding the plurality of tokens and operable for selecting manually one-by-one the game play sequence of game symbols.

17. The game system as recited in claim 12, wherein each game play station configured for display of the set of game symbols of the game card as a matrix of rows and columns during play of a random draw game.

18. The game system as recited in claim 12, wherein the respective sequence is used for play of each random draw game initiated on a respective one of the game play stations during a predetermined period.

19. The game system as recited in claim 12, wherein each of the plurality of sequences has a predetermined period for use during play of an initiated game.

20. A method play of a plurality of random draw games, comprising the steps of:

(a) generating a plurality of sequences of a plurality of game symbols, each said sequence drawn randomly one-by-one from a hopper holding a pool of a plurality of game tokens, each of the game tokens having a respective unique game symbol, each of the plurality of sequences for use during play of a random draw game;

(b) storing each of the plurality of the sequences in a memory device of a game controller configured for operating a plurality of game play stations, each game play station configured for play of a random draw game initiated by a player;

(c) in response to initiating the random draw game, providing the respective game play station with a respective game card having a subset of the plurality of the game symbols selected randomly for play of the random draw game;

(d) receiving a respective one of the game symbols one-by-one in the drawn order of a respective one of the sequences for determining whether one of the game symbols of the game card matches said respective one of the game symbols of the sequence; and (e) awarding a prize upon the game card matching a predetermined number of the game symbols game symbols of the respective one of the sequences.

21. The method for play as recited in claim 20, comprising the step of the game controller communicating the sequence of the game play symbols to the plurality of game play stations for play of the random draw game.

22. The method for play as recited in claim 20, wherein the game play station displays the subset of game symbols for the game card in a matrix of rows and columns.

23. The method for play as recited in claim 20, wherein the respective sequence of game symbols is associated with a predetermined period of time for play of the random draw game initiated within the predetermined period of time.

24. The method for play as recited in claim 20, wherein the respective sequence is selected randomly.

25. The method for play as recited in claim 24, wherein the respective sequence is excluded from further selection until after each other of the plurality of sequences is selected for play of a random draw game.

26. The method for play as recited in claim 20, wherein the plurality of sequences are used in sequential order before repeating.

27. The method for play as recited in claim 20, wherein the game controller associates a respective period of time with each of the sequences for use during a respective period.

* * * * *